Patented July 8, 1924.

1,500,794

UNITED STATES PATENT OFFICE.

MAURICE ERNEST BOUVIER AND EMILE BLANC, OF LYON, FRANCE, ASSIGNORS TO SOCIÉTÉ CHIMIQUE DES USINES DU RHÔNE, OF PARIS, FRANCE.

CATALYSTS.

No Drawing.      Application filed September 14, 1923. Serial No. 662,757.

*To all whom it may concern:*

Be it known that we, MAURICE ERNEST BOUVIER, of Lyon, France, and EMILE BLANC, of Lyon, France, both citizens of the Confederation of Switzerland, have invented certain new and useful Improvements in Catalysts of which the following is a specification.

The catalytic action of copper or of its derivatives, and, particularly, of its oxides, has been known for a long time, and is of current technical application in industry and in laboratories for the purpose of accelerating a number of oxidation reactions or pyrogenous decompositions.

Relating to hydrogenation or reduction reactions, or, at any rate, a great number of these reactions, the catalytic activity of metallic copper reduced from its oxides or used under the form of a highly divided powder, first pointed out by Sabatier, has, since its discovery, been investigated by many scientists.

In spite of this, however, the use of this metal or of its derivatives as catalyst in hydrogenation or reduction reactions has not spread in industrial processes, although these make current use of nickel, platinum, palladium, etc., under various forms, in order to accelerate reactions of this kind.

This is no doubt due to the fact that the activity of catalysts, the basis of which is copper, varies widely with their manner of preparation (see Sabatier, "La Catalyse en Chimie Organique," Paris, 1913, p. 106; Henderson, "Catalysis in Industrial Chemistry," London, 1919, p. 10) and also because the best copper catalysts hitherto prepared have only yielded insufficient technical results.

After a minute and delicate research in the catalysts obtained by the reduction of various oxides or hydrated oxides of copper in a stream of hydrogen, we have discovered a very simple process for the preparation of extremely active catalytic agents which constitute the object of the present invention.

We have discovered that, contrary to the opinion entertained hitherto, the most active catalysts of the type referred to are not constituted by metallic copper, the catalytic properties of which are connected to a particular physical form, indicated, for instance, by the colour, but that the active catalysts are constituted by oxygenated derivatives of copper, which alone have marked catalytic properties.

We have noticed that if these active catalysts, either new or even after they have been used for a long time to accelerate hydrogenation or reduction reactions, are treated at about 300° to 400° C. with a stream of dry nitrogen, there is no formation of water, while if they are treated similarly with a stream of dry hydrogen, a noticeable quantity of water is formed.

This quantity of water may naturally vary in wide limits. It may be mentioned, as an example, that, for good catalysts, the quantity of water formed is about 1 molecule of water for 4 atoms of metallic copper in the catalyst. This quantity, however, is merely given as an illustration, and by no means as a limit to the quantity of water which my be formed in specially favourable cases.

We have also observed that these active catalysts dissolve in dilute sulphuric acid in variable but noticeable amounts, any oxidation by the air being carefully guarded against. This is a further proof that oxygenated derivatives of copper, and not metallic copper, are concerned.

Finally we have ascertained that catalysts prepared by various processes, but not giving rise to any evolution of water when treated with dry hydrogen at 400° C. or insoluble or almost insoluble in dilute sulphuric acid when oxidation by the air is prevented, do not possess any catalytic activity, or only a very insignificant catalytic activity in the reactions which have made the object of the above research.

From another point of view we have made the very important remark that the activity of these catalysts, defined as indicated above, is increased in considerable proportions when they are prepared in such a way that they contain a relatively small quantity of a mineral compound with an alkaline reaction such as caustic alkalis (including lithia), alkaline-earth metal bases (including magnesia and zinc oxide) and alkaline salts of these alkali or alkaline-earth metal bases, such as carbonates, phosphates, borates and the like.

The increased activity due to the base or the basic salt varies naturally with the metal base or the alkaline salt added. It is sufficient that the base or alkaline salt be present in very small quantities, inferior to 0.25% for instance; but a larger quantity may be present, within relatively large limits, without sensibly diminishing the activity of the catalyst. In all cases, the catalyst so obtained, treated with water, gives a noticeable alkaline reaction with the customary reagents.

We have ascertained that this increase of activity of these catalysts, due to alkali or alkaline-earth metal bases or their alkaline salts, is not due to the particular catalytic properties of the said bases or alkaline salts, which, taken individually, have not perceptibly accelerated the investigated reactions.

We have also discovered that the addition to the neutral catalysts of alkali or alkaline-earth metal bases or of the alkaline salts of these bases, increases noticeably their activity without the necessity of dissolving and precipitating again the said catalysts. If even, in any suitable manner, it has been possible to avoid any oxidation of the catalysts during the addition of the said bases or their alkaline salts, it is not necessary to reduce them again partially, before use, in a stream of hydrogen.

Whatever may be the far-reaching theoretical explanation of the remarkable facts which we have discovered, and which are described above, the practical rules to be observed in the preparation of the very active catalysts, objects of the present invention, follow immediately from what has been said above and may be stated as follows:

Any suitable copper oxide or hydrated oxide obtained by means of any usual or known process, is taken as the starting point, and is spread, if it is desired, on any suitable inert support. For instance, one will start from the black copper hydrated oxide obtained by precipitation by caustic alkalis from boiling solutions of cupric salts, or in any other way.

The oxides or hydrated oxides may or may not be washed until they cease to give an alkaline reaction. If they are washed completely, before being dried, they must be treated with a suitable dilute solution of alkali or alkaline-earth metal bases or alkaline salt thereof (either alone or mixed) or these bases or alkaline salts may be incorporated therein by any other suitable process. This treatment may also be applied to a new catalytic mass which is already prepared, or to such a catalytic mass which has been made use of, and requires regenerating.

The hydrated oxides or oxides, whatever may be their origin, neutral or with the addition of bases or alkaline salts as indicated above, are subsequently dried, if needed, by the ordinary known methods.

They are then reduced, preferably in the apparatus and at the place itself which they are to occupy finally, care being taken to stop before the reduction is complete.

For this purpose, the catalytic mass is heated by any suitable known means, before or during the passage of the stream of hydrogen, but in any case, during this passage, at a temperature above 80° C., which may vary between wide limits, without, however, much exceeding 160° C., for instance to 130° to 140° C.

This treatment will be continued until the weight of the catalytic mass remains sensibly constant at the selected temperature. The active catalytic mass is then ready for use.

What we claim and desire to secure by Letters Patent is:—

1. A process for the preparation of highly active catalytic agents by the incomplete reduction of an oxide of copper to which is added at any stage of the process an inorganic substance having an alkaline reaction.

2. A process for the preparation of highly active catalytic agents by the incomplete reduction in a stream of hydrogen of an oxide of copper to which is added at any stage of the process an inorganic substance having an alkaline reaction.

3. A process for the preparation of highly active catalytic agents by the incomplete reduction in a stream of hydrogen of a hydrated oxide of copper to which is added at any stage of the process an inorganic substance having an alkaline reaction.

4. A process for the preparation of highly active catalytic agents by the incomplete reduction in a stream of hydrogen of a hydrated oxide of copper to which an alkaline base is added at any stage of the process.

5. A process for the preparation of highly active catalytic agents by the incomplete reduction in a stream of hydrogen of a hydrated oxide of copper to which an alkaline-earth metal base is added at any stage of the process.

6. A process for the preparation of highly active catalytic agents by the incomplete reduction in a stream of hydrogen of a hydrated oxide of copper to which a basic salt of a metal forming oxide with alkaline reaction is added at any stage of the process.

7. A process for the preparation of highly active catalytic agents by the incomplete reduction in a stream of hydrogen of a hydrated oxide of copper to which an alkaline salt of an alkaline-earth metal is added at any stage of the process.

8. A process for the preparation of highly active catalytic agents by the incomplete reduction in a stream of hydrogen of a hydrated oxide of copper, at a temperature insufficient for complete reduction to metallic copper, to which an alkaline salt of an alkaline-earth metal is added at any stage of the process.

9. A process for the preparation of highly active catalytic agents by the incomplete reduction in a stream of hydrogen of a hydrated oxide of copper at a temperature of 80° to about 160° C. and adding at any stage of the process a dried inorganic substance having an alkaline reaction.

10. Catalysts as obtained by the process claimed in claim 1, comprising an incompletely reduced oxide of copper to which a dried inorganic substance having an alkaline reaction has been added.

In testimony whereof we have signed our names to this specification.

MAURICE ERNEST BOUVIER.
EMILE BLANC.